(12) United States Patent
Quesnel

(10) Patent No.: US 11,364,854 B2
(45) Date of Patent: Jun. 21, 2022

(54) TRIM ELEMENT COMPRISING A DOUBLE SIDED FUNCTIONAL ELEMENT

(71) Applicant: FAURECIA INTERIEUR INDUSTRIE, Nanterre (FR)

(72) Inventor: Benjamin Quesnel, Valencia (ES)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 109 days.

(21) Appl. No.: 16/861,159

(22) Filed: Apr. 28, 2020

(65) Prior Publication Data
US 2020/0339041 A1  Oct. 29, 2020

(30) Foreign Application Priority Data
Apr. 29, 2019 (FR) .................................. 19 04516

(51) Int. Cl.
*B60R 11/00* (2006.01)
*B60R 11/02* (2006.01)
*B60N 2/75* (2018.01)

(52) U.S. Cl.
CPC .......... *B60R 11/0241* (2013.01); *B60N 2/797* (2018.02)

(58) Field of Classification Search
None
See application file for complete search history.

(56) References Cited

U.S. PATENT DOCUMENTS

| | | | | |
|---|---|---|---|---|
| 8,072,743 B2* | 12/2011 | Kissel | ................. | B60R 11/0235 |
| | | | | 361/679.21 |
| 9,004,569 B2* | 4/2015 | Hamamoto | ............ | B60N 3/101 |
| | | | | 296/65.03 |
| 10,351,001 B2* | 7/2019 | Beauregard | ............ | B60K 35/00 |
| 10,696,162 B2* | 6/2020 | Benchikhi | ............ | B60R 11/0264 |
| 10,710,458 B2* | 7/2020 | Helot | .................... | B60K 37/06 |
| 11,117,470 B2* | 9/2021 | Koller | ............... | B60R 21/01552 |
| 2002/0100559 A1 | 8/2002 | Kohinata et al. | | |
| 2006/0062007 A1* | 3/2006 | Feldman | ................... | B60Q 3/12 |
| | | | | 362/488 |
| 2015/0350397 A1* | 12/2015 | Vourlat | ................. | G06F 1/1632 |
| | | | | 455/575.9 |
| 2016/0129851 A1* | 5/2016 | Werner | ................... | B60K 35/00 |
| | | | | 701/49 |

FOREIGN PATENT DOCUMENTS

| | | | |
|---|---|---|---|
| DE | 10053963 A1 | 5/2001 | |
| DE | 10212881 A1 | 10/2003 | |
| FR | 2954611 A1 | 6/2011 | |

OTHER PUBLICATIONS

French Search Report corresponding to French Application No. FR 1904516, dated Jan. 6, 2020, 2 pages.

* cited by examiner

*Primary Examiner* — Steven M Marsh
(74) *Attorney, Agent, or Firm* — Reising Ethington P.C.

(57) ABSTRACT

A trim element having a functional element that includes a first outer surface and a second outer surface, opposite the first outer surface along a thickness direction of the functional element, the first outer surface having at least one display or control device relative to at least one function of the vehicle. The second outer surface includes a holder device for a nomadic electronic apparatus on the second outer surface.

12 Claims, 5 Drawing Sheets

TRIM ELEMENT COMPRISING A DOUBLE SIDED FUNCTIONAL ELEMENT

TECHNICAL FIELD

The present invention relates to a trim element of the type including a functional element comprising a first outer surface and a second outer surface, opposite the first outer surface along a thickness direction of the functional element, the first outer surface comprising at least one display and/or control device relative to at least one function of the vehicle.

BACKGROUND

Such a trim element for example forms an armrest or a center console of a vehicle.

It is known to equip such a trim element with a display device and/or a control device for one or several functions of the vehicle, for example the opening of the windows, the control of a ventilation system, soundproofing or the like. The display device and the control device are for example combined in a touch-sensitive screen or a backlit touch-sensitive surface making it possible both to display information relative to a function, for example in the form of icons, and to control this function by touch-sensitive contact for example with these icons. Such a display and/or control device extends over an outer and visible surface of the trim element so as to be accessible to one or several passengers of the vehicle.

Furthermore, it is also known to provide, in the passenger compartment, a device for holding a nomadic electronic apparatus, such as a mobile telephone, a smartphone, a digital tablet or the like. The holder device is arranged so that the screen of the nomadic electronic apparatus remains visible and accessible to a user seated in the vehicle. The nomadic electronic apparatus received in the holder device can then be coupled to a control device of the vehicle and be used to control one or several functions of the vehicle.

Thus, the control of a same function can be done redundantly using the fixed control device of the trim element and using the nomadic electronic apparatus when it is connected to the vehicle and held in the holding system.

However, such an arrangement requires having two accessible free surfaces for the passengers of the vehicle, one receiving the fixed display and/or control device, which is not used when a nomadic electronic apparatus is connected to the vehicle, and the other receiving the holder device, which is not used when no electronic apparatus is received. This thus results in a loss of useful space in the passenger compartment. Furthermore, the appearance of the passenger compartment is deteriorated, in particular when the holder device does not receive an electronic apparatus, because the unused holder remains visible in the passenger compartment.

SUMMARY

One of the aims of the invention is to address these drawbacks by proposing an optimized trim element for a nomadic electronic apparatus while having an appearance and functionalities that are satisfactory when no nomadic electronic apparatus is received.

To that end, the invention relates to a trim element of the aforementioned type, wherein the second outer surface comprises a holder device for a nomadic electronic apparatus on said second outer surface.

Thus, the trim element according to at least some embodiments of the invention makes it possible to display and/or control a function in the absence of a nomadic electronic apparatus by using the display and/or control device extending over the first outer surface and to use the holder device to receive a nomadic electronic apparatus. The first outer surface and the second outer surface being opposite one another along a thickness direction, the bulk of the trim element is reduced, since it does not require two surfaces extending next to one another in order to receive the display and/or holder device and to receive the holder device. The useful space in the passenger compartment is thus increased. Furthermore, the unused outer surface can easily be hidden to improve the appearance of the trim element.

According to other optional features of the trim element according to the invention, considered alone or according to any technically conceivable combination:

the first outer surface and the second outer surface are substantially parallel to one another;

the trim element further comprises a hinge device of the functional element relative to a body about an axis of rotation substantially perpendicular to the thickness direction, the functional element being rotatable relative to said body about said axis of rotation between a first position, in which the first outer surface forms at least part of the visible surface of the functional element facing the user of said functional element of the trim element, and a second position, in which the second outer surface forms said part of the visible surface of the functional trim element facing the user;

the trim element further comprises a first proximity sensor associated with the first outer sensor and a second proximity sensor associated with the second outer sensor, the functional element being arranged to place itself in the first position when the first proximity sensor detects the presence of an object near the first outer surface and to place itself in the second position when the second proximity sensor detects the presence of an object in the vicinity of the second outer sensor;

the holder device comprises a suction device arranged to press and keep a nomadic electronic apparatus on the second outer surface, said suction device emerging through at least one orifice in said second outer surface;

the holder device is further associated with at least one weight sensor of said nomadic apparatus kept on the second outer surface, a control system being arranged to emit an alert signal if the weight of the object kept on the second outer surface is greater than the maximum weight that can be kept by the suction device and/or if the object kept on the second outer surface is not substantially centered on said second outer surface;

the functional element further comprises a control system for at least one function of the vehicle, said control system being steered by a user by means of the display and/or control device extending over the first outer surface when no nomadic electronic apparatus is received on the second outer surface and by means of a nomadic electronic apparatus when said electronic apparatus is kept on the second outer surface;

a wireless recharge device extends in the vicinity of the second outer surface, said recharge device being arranged to supply energy to a nomadic electronic apparatus received on the second outer surface;

the display device extending over the first outer surface is formed by a touch-sensitive screen arranged to control at least one function of the vehicle by contact with the screen and to display at least one information item relative to said function;

the trim element further comprises a body, the functional element being mounted removably on said body by means of a magnetic element provided on the functional element and an additional magnetic element provided on the body, the magnetic element and the additional magnetic element cooperating with one another to keep the functional element on the body; and the trim element forms a seat armrest, a door armrest or a center console of a vehicle, etc.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
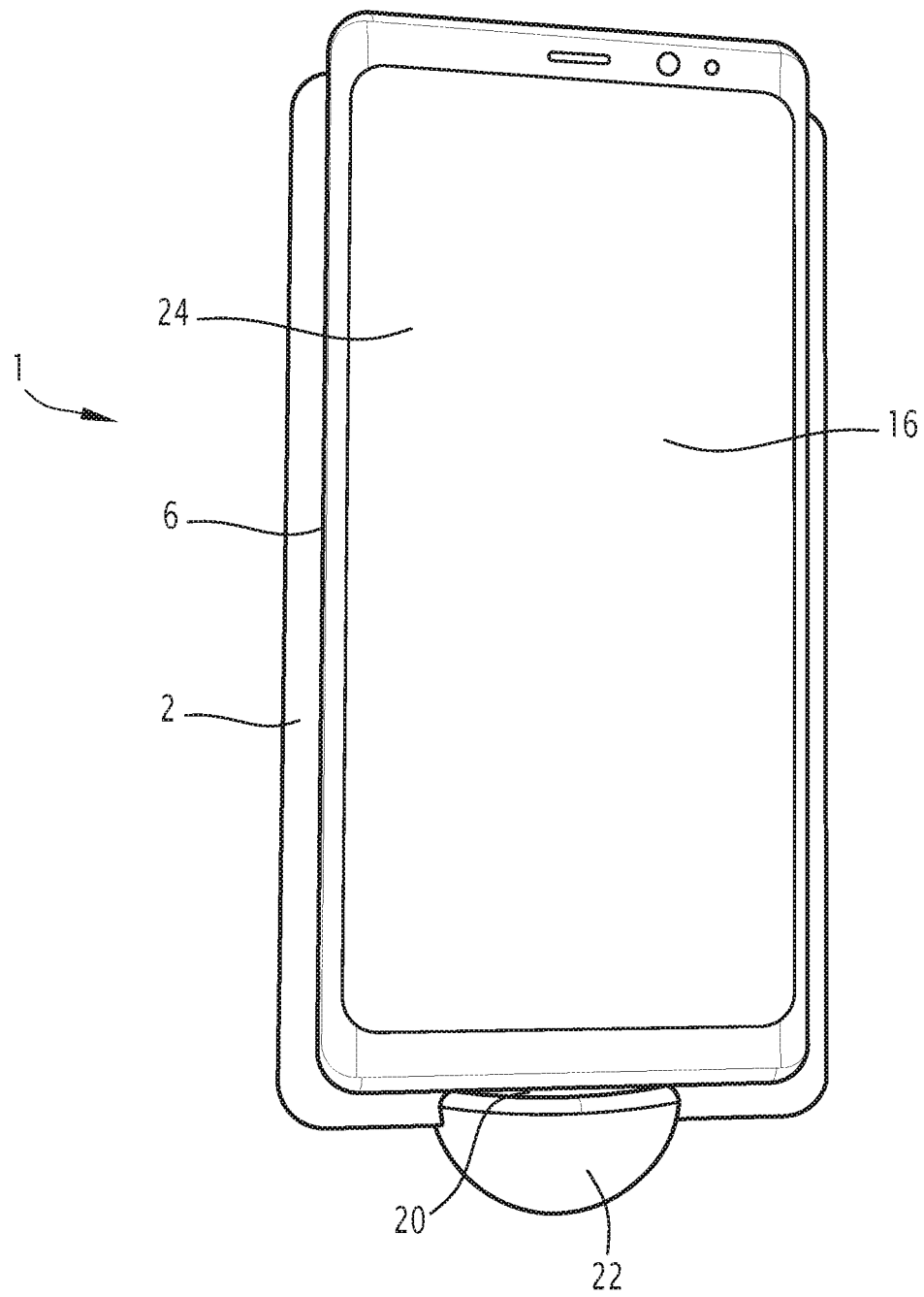
FIG. 1 is a schematic perspective illustration of part of a trim element according to an embodiment of the invention, the first outer surface being visible.

In reference to the figures, a trim element 1 is described comprising a body 3 (FIG. 5) and a functional element 2 mounted on the body. According to one embodiment, the functional element 2 is mounted removably on the body 3, as will be described later. Such a trim element for example forms a vehicle armrest, a center console or the like, the functional element 2 for example extending one end of the trim element 1, for example protruding from the body 3. Thus, in the case of an armrest, the bearing surface of the armrest is for example formed by an upper surface 5 of the body 3 and the functional element 2 extends at one end of the body 3 so as to be accessible for the hand of the passenger using the armrest.

The functional element 2 comprises a first outer surface 4 and a second outer surface 6, opposite the first outer surface 4 along a thickness direction e of the functional element 2. The first outer surface 4 and the second outer surface 6 are substantially parallel to one another and are spaced apart from one another along the thickness direction e. The thickness e of the functional element 2 for example corresponds to the smallest dimension of the functional element 2 in the case of a parallelepipedal functional element, the first outer surface 4 and the second outer surface 6 forming the two opposite, substantially rectangular large faces of the parallelepiped. The outer surfaces 4 and 6 extend along an elevation direction between the base, arranged to allow the fastening of the functional element to the body 3, and an end opposite the base. Lateral edges extend along the elevation direction on either side of the outer surfaces 4 and 6, and join the base to the opposite end.

Figure 2:
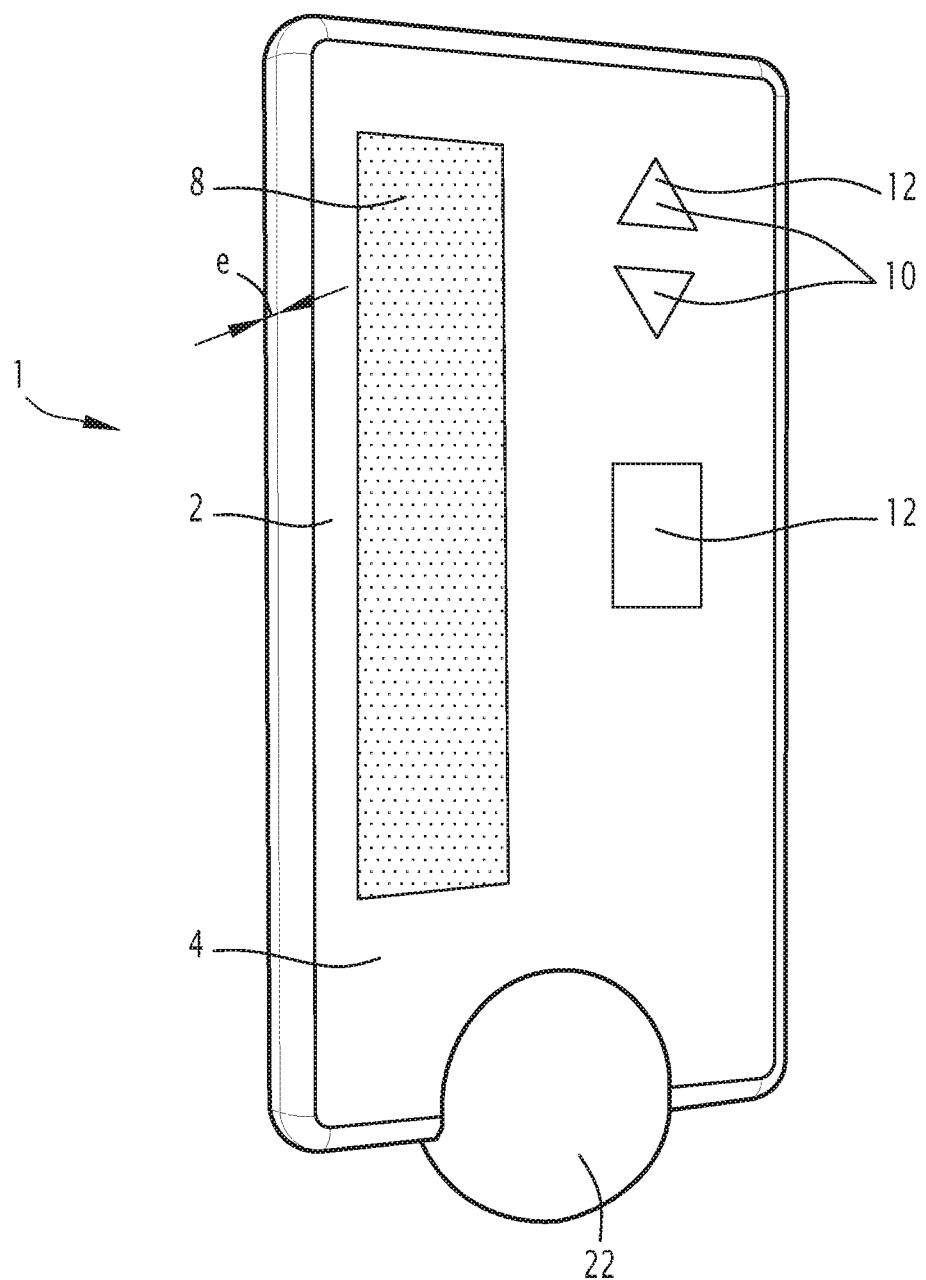
FIG. 2 is a schematic perspective illustration of part of the trim element of FIG. 1, the second outer surface receiving a nomadic electronic apparatus.

The first outer surface 4, more particularly visible in FIG. 2, forms a display surface and/or a control surface for a passenger of the vehicle. To that end, the first outer surface 4 comprises at least one display device 8 and/or at least one control device 10 that are visible from the outside of the first outer surface 4, as shown in FIG. 2.

The display device 8 is for example formed by a screen extending over at least part of the first outer surface 4 and making it possible to display one or several information items relative to at least one or several functions of the vehicle and/or to at least one or several functions of an apparatus connected to the vehicle. The control device 10 is arranged to make it possible to steer one or several functions of the vehicle and/or one or several functions of an apparatus connected to the vehicle. The control device 10 for example comprises one or several buttons or keys making it possible to steer the functions. In a variant, the actuation of the control device is done by simple tactile contact, for example on a capacitive film. In this case, the zone(s) 12 allowing the actuation are for example indicated by backlighting of this or these zones, that is to say, by backlighting this or these zones from the inside of the functional element 2. This or these zones for example have a shape associated with the controlled function, for example a cursor or arrow shape or any other suitable icon. According to one embodiment, the display device 8 and the control device 10 are combined, for example by covering the screen with a capacitive film in order to form a touch-activated screen. It is understood that several display devices 8 and/or control devices 10 can be provided on the first outer surface 4 as a function of the number and nature of information items to be displayed and/or functions to be controlled. According to one embodiment, in particular when the display device 8 and the control device 10 are combined, the display device 8 occupies the majority, or even all, of the first outer surface 4.

According to one embodiment, the information item(s) and/or the function(s) steered from the first outer surface 4 are linked to "simple" functions of the vehicle by means of a control system of the functional element or the vehicle (not shown). Thus, the controlled functions are for example the movement of the windows, of the rearview mirrors, the setting of the position of the trim element 1 and/or of one or several seats, the control of the heating and ventilation system and/or the control of a soundproofing system of the passenger compartment of the vehicle, etc. The information items displayed by the display device 8 are for example related to these functions and for example further, or in a variant, comprise information on the temperature in the passenger compartment and/or outside the vehicle, information on the geolocation of the vehicle and/or time and date information, etc.

Figure 3:
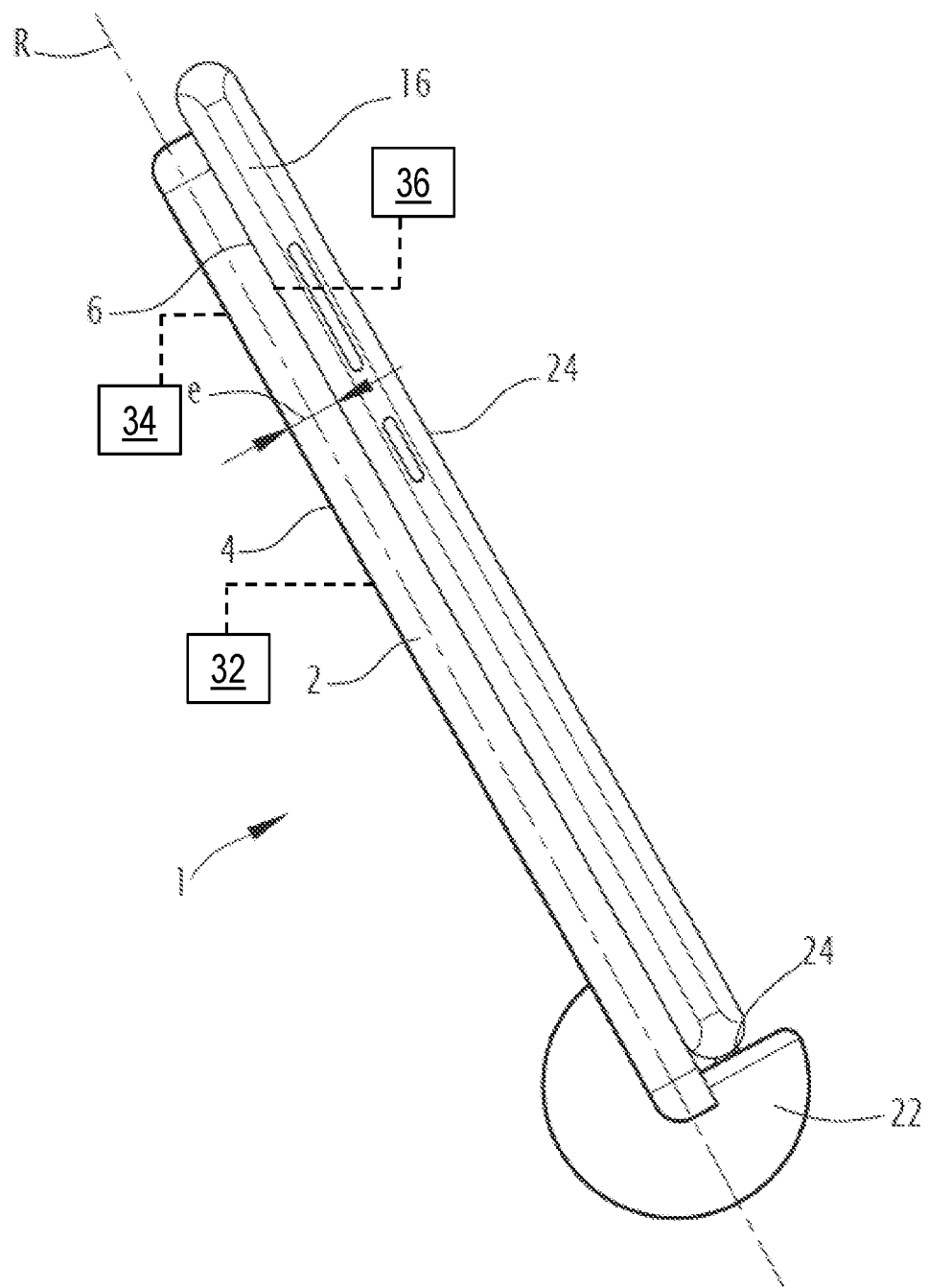
FIG. 3 is a schematic side illustration of part of the trim element of FIG. 1, the second outer surface receiving a nomadic electronic apparatus.
Figure 4:
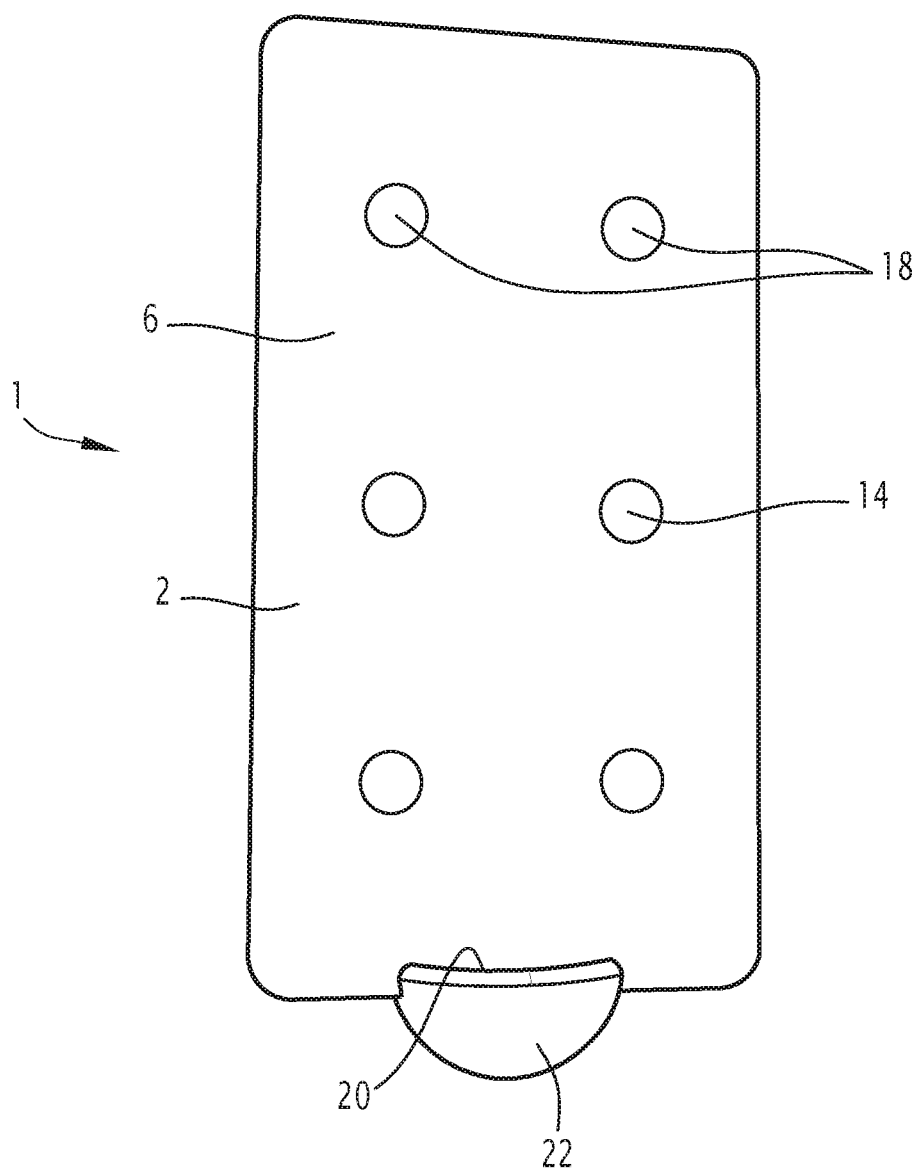
FIG. 4 is a schematic perspective illustration of part of the trim element of FIG. 1, the second outer surface not receiving a nomadic electronic apparatus.

The second outer surface 6, more particularly visible in FIG. 4, comprises a holder device 14 for a nomadic electronic apparatus 16, shown in FIGS. 2 and 3, on the second outer surface 6. A holder device 14 refers to any device able to keep a nomadic electronic apparatus 16 pressed against the second holding surface 6 against gravity and/or a force below a threshold corresponding to a tear out force. The holder device 14 can be of any suitable nature, such as a clamp or other types of mechanical holding means.

According to the embodiment shown in FIG. 4, the holder device 14 is formed by a suction device comprising one or several orifices 18 emerging in the second surface 6 and fluidly connected with a pump positioned in the functional element 2 or in the body. Such a suction device makes it possible to keep a nomadic electronic apparatus 16 pressed against the second outer surface 6 by suction once the nomadic electronic apparatus 16 is brought close to the second outer surface 6. Furthermore, such a holder device 14 has the advantage of not comprising an element protruding toward the outside of the second outer surface 6, which improves the esthetics of the trim element 1, in particular when the second outer surface 6 is not used to hold a nomadic electronic apparatus 16.

Such a holder device 14 is for example associated with one or several sensors, such as weight sensors 20 of a nomadic apparatus 16, to detect the presence of a nomadic electronic apparatus 16 on the second outer surface 6. The sensor(s) 20 are for example positioned in a base 22 provided along one edge of the second outer surface 6 and against which a lower edge of the nomadic electronic apparatus 16 rests when the latter is received on the second outer surface 6, as shown in FIGS. 2 and 3.

Such sensors 20 are associated with the control system of the functional element 2, which can be arranged to trigger the holder device 14 when a nomadic electronic apparatus 16 is positioned on the second holding surface 6. Furthermore, owing to the information acquired by the sensor(s) 20, the control device can also be arranged to emit an alert signal to the attention of a user if the nomadic electronic apparatus 16 is incorrectly positioned on the second outer surface 6 and/or if it has inappropriate dimensions in order to inform the user of a risk of the nomadic electronic apparatus 16 falling from the second outer surface 6. The sensors are in fact able to determine incorrect positioning of the nomadic electronic apparatus 16, for example incorrect centering of the apparatus on the second outer surface 6. Furthermore, the sensors are able to determine whether the nomadic electronic apparatus 6 is inappropriate for the holder device 14 if it has a mass exceeding a predetermined mass corresponding to the maximum mass able to be held by the suction device.

The second holding surface 6 is provided to receive a nomadic electronic apparatus 16 of the mobile telephone, smartphone, digital tablet type or the like. The nomadic electronic apparatus 16 is received such that its screen 24, and if applicable its keyboard, face toward the outside and are therefore visible and accessible for a user of the trim element 1. In other words, when the nomadic electronic apparatus 16 is received on the second outer surface 6, the user can use it, by tactile command on the screen or by actuation of the keyboard.

The control system of the functional element is for example arranged to be coupled to the nomadic electronic apparatus 16, such that the nomadic electronic apparatus 16 makes it possible, when it is connected to the control system, to display information related to the vehicle and/or to control one or several functions of the vehicle. The communication between the control system and the nomadic electronic apparatus 16 is for example done using a remote communication technology, for example Near Field Communication (NFC), by Bluetooth or the like.

According to one embodiment, the control system is arranged so that the information items displayed and/or the functions controlled by the display device(s) 8 and/or the control device(s) 10 of the first outer surface 4 are also displayed and/or controlled by the nomadic electronic apparatus 16 when the latter is received on the second outer surface 6 and connected to the control system. In a variant, the control system is arranged to give priority to the display and/or control by the nomadic electronic apparatus 16 when the latter is connected to the control system, for example by deactivating the display and/or control by means of the first outer surface 4 or by making the display device 8 and/or the control device 10 be governed by the nomadic electronic apparatus 16.

According to one embodiment, the control system is steered by a user by means of the display and/or control device 8, 10 extending over the first outer surface 4 when no nomadic electronic apparatus 16 is received on the second outer surface 6 and by means of a nomadic electronic apparatus 16 when said electronic apparatus 16 is kept on the second outer surface 6.

According to one embodiment, the control system is arranged to identify the nomadic electronic apparatus 16 that is received on the second outer surface 6. If this identification is linked to a recognized user of the vehicle, the control system can then be arranged to adapt the position of the seat and/or of the rearview mirrors and/or to apply particular settings of the vehicle related to a profile of this user automatically once the nomadic electronic apparatus 16 is received on the second outer surface 4. Thus, merely connecting the nomadic electronic apparatus 16 to the control system causes an adaptation of at least part of the passenger compartment to the user owning the apparatus.

According to one embodiment, the functional element 2 further incorporates a device 32 for wirelessly recharging the battery of the nomadic electronic apparatus 16 extending near the second outer surface 6 so as to supply power to the nomadic electronic apparatus 16 when the latter is received on the second outer surface 6.

According to one embodiment, the functional element 2 is further movable relative to the body 3 of the trim element so as to allow the orientation of the first and second outer surfaces 4 and 6 to be modified.

To that end, the functional element 2 is for example mounted on the body 3 using a hinge device, for example provided in the base 22. The hinge device is for example arranged to allow a rotation of the functional element 2 about an axis of rotation R. The axis of rotation R is substantially parallel to the outer surfaces 4 and 6 and extends in the space between the outer surfaces 4 and 6 perpendicular to the thickness direction e.

The axis of rotation R passes through the base of the functional element 2 hinged to the body 3 and through the end of the functional element opposite the base, as shown in FIG. 3. In other words, the axis of rotation extends along the elevation direction of the functional element, which makes the functional element able to rotate around itself.

Such a movement makes it possible to orient the first outer surface 4 or the second outer surface 6 toward the user along the outer surface that is used to display information and/or control functions. The functional element is thus movable between a first position, in which the first outer surface 4 forms a visible surface of the functional element 2 facing toward the user of the functional element 2, and a second position, in which the second outer surface 6 forms said visible surface of the functional element 2 facing the user. Visible part refers to the part visible by a user when he is seated in a seat of the vehicle. The first outer surface 4 and the second outer surface 6 being opposite one another, in the first position, the second outer surface 6 is hidden by the first outer surface 4, and conversely, in the second position, the first outer surface 4 is hidden by the second outer surface 6. Hide means that the hidden part is not directly visible by the user seated in the seat.

Thus, when a nomadic electronic apparatus 16 is received on the second outer surface 6, the functional element 2 is placed in the second position, in which the second outer surface 6 is oriented toward the user such that the latter can use the nomadic electronic apparatus 16 ergonomically. When no nomadic electronic apparatus 16 is received on the second outer surface 6, the functional element 2 is placed in the first position so as to orient the first outer surface 4 toward the user, such that the latter is directly visible and accessible to the user.

Figure 5:
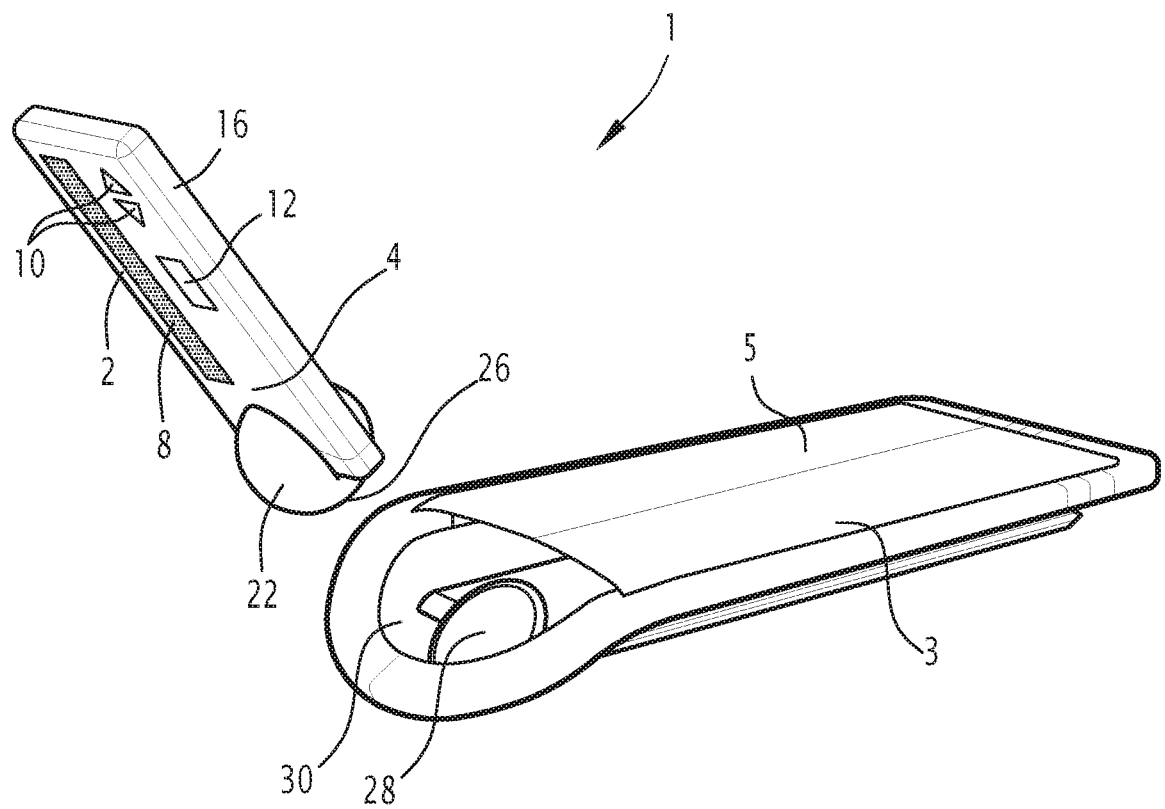
FIG. 5 is an exploded schematic perspective illustration of a trim element.

According to the embodiment shown in FIG. 5, the functional element 2 is mounted removably on the body 3 by means of reversible fastening elements provided between the functional element 2 and the body 3. Such reversible fastening elements are for example formed by a magnetic element 26 provided in the base 22 of the functional element and by a complementary magnetic element 28 provided in a housing 30 provided at one end of the body 3. The magnetic element 26 and the complementary magnetic element 28 cooperate with one another when the base 22 is brought closer to the housing 30 in order to hold the functional element 2 on the body 3. Such an embodiment makes it possible to change the position of the functional element 2 easily, for example to fasten it on another body 3. As an example, the functional element 2 can thus be associated with different armrests of the vehicle in order to be used by different users or to adapt the position of the functional element 2 to the hand with which a user wishes to use the functional element 2. Thus, a left-handed person may prefer to fasten the functional element 2 on the body 3 forming the armrest to his left, while a right-handed person may prefer to fasten the functional element 2 on the body 3 forming the armrest to his right.

According to one embodiment, the complementary magnetic element 28 is for example rotatable in the housing 30 so as to make it possible to place the functional element 2 in the first or second position.

According to one embodiment, the orientation of the outer surfaces 4 and 6 is done automatically, for example owing to a first proximity sensor 34 associated with the first outer surface 4 and a second proximity sensor 36 associated with the second outer surface 6. These sensors are arranged to send a signal to the control system when an object or a hand comes close to one of the outer surfaces 4 and 6 and the control system is then arranged to rotate the corresponding outer surface toward the user. Such proximity sensors, or presence detectors, for example comprise an emitter of a field around the sensors, this field being modified when an object penetrates it. Such a field is for example a magnetic field, an electrical field or an electromagnetic field. In a variant, the emitter emits a light ray, for example in the infrared domain.

The proximity sensors are arranged so that the functional element 2 place itself in the first position when the first proximity sensor detects the presence of an object near the first outer surface 4 and places itself in the second position when the second proximity sensor detects the presence of an object near the second outer surface 6. Near for example refers to a distance of between 0.1 mm and 50 mm between the object and one of its outer surfaces, preferably a distance between 0.1 mm and 20 mm.

Furthermore, the control system can be arranged to rotate the functional element 2 so as to orient the first outer surface 4 toward the user when a nomadic electronic apparatus 16 is removed from the second outer surface 6.

The trim element described above thus makes it possible to combine, in a functional element, the display and control surfaces and the surface for receiving a nomadic electronic apparatus by limiting the bulk of these surfaces, since they are opposite one another and not adjacent. The functional element 2 further has good ergonomics and a satisfactory appearance.

Additionally, the hinge device and its axis of rotation R allow the passage of the functional element 2 from one position to the other without increasing the bulk of said functional element 2. Indeed, the functional element 2 occupies the same space in the passenger compartment of the vehicle, irrespective of its position. This further leads to better ergonomics and greater comfort for the user.

The invention claimed is:

1. A trim element for a vehicle, comprising a functional element having a first outer surface and a second outer surface, opposite the first outer surface along a thickness direction of the functional element, the first outer surface comprising at least one display or control device relative to at least one function of the vehicle, wherein the second outer surface comprises a holder device for a nomadic electronic apparatus on said second outer surface, wherein the trim element further comprises a hinge device of the functional element relative to a body about an axis of rotation substantially parallel to the outer surfaces, passing between the outer surfaces and passing through a base of the functional element hinged to the body and through an end of the functional element opposite the base, the functional element being rotatable relative to said body about said axis of rotation between a first position, in which the first outer surface forms a visible surface of the functional element facing the user of said functional element, and a second position, in which the second outer surface forms said visible surface of the functional element facing the user.

2. The trim element according to claim 1, wherein the first outer surface and the second outer surface are substantially parallel to one another.

3. The trim element according to claim 1, comprising a first proximity sensor associated with the first outer sensor and a second proximity sensor associated with a second outer sensor, the functional element being arranged to place itself in the first position when the first proximity sensor detects the presence of an object near the first outer surface and to place itself in the second position when the second proximity sensor detects a presence of an object in the vicinity of a second outer sensor.

4. The trim element according to claim 1, wherein the holder device comprises a suction device arranged to press and keep a nomadic electronic apparatus on the second outer surface, said suction device emerging through at least one orifice in said second outer surface.

5. The trim element according to claim 4, wherein the holder device is further associated with at least one weight sensor of said nomadic apparatus kept on the second outer surface, a control system being arranged to emit an alert signal if a weight of the object kept on the second outer surface is greater than a maximum weight that can be kept by the suction device or if the object kept on the second outer surface is not substantially centered on said second outer surface.

6. The trim element according to claim 1, wherein the functional element further comprises a control system for at least one function of the vehicle, said control system being steered by a user by means of the display or control device extending over the first outer surface when no nomadic electronic apparatus is received on the second outer surface and by means of a nomadic electronic apparatus when said electronic apparatus is kept on the second outer surface.

7. The trim element according to claim 1, wherein a wireless recharge device extends in a vicinity of the second outer surface, said recharge device being arranged to supply energy to a nomadic electronic apparatus received on the second outer surface.

8. The trim element according to claim 1, wherein the display device extending over the first outer surface is formed by a touch-sensitive screen arranged to control at least one function of the vehicle by contact with the screen and to display at least one information item relative to said function.

9. The trim element according to claim 1, further comprising a body, the functional element being mounted removably on said body by means of a magnetic element provided on the functional element and an additional magnetic element provided on the body, the magnetic element and the additional magnetic element cooperating with one another to keep the functional element on the body.

10. The trim element according to claim 1, forming a seat armrest, a door armrest or a center console of a vehicle.

11. A trim element for a vehicle, comprising a functional element having a first outer surface and a second outer surface, opposite the first outer surface along a thickness direction of the functional element, the first outer surface comprising at least one display or control device relative to at least one function of the vehicle, wherein the second outer surface comprises a holder device for a nomadic electronic apparatus on said second outer surface, wherein the holder device comprises a suction device arranged to press and keep a nomadic electronic apparatus on the second outer surface, said suction device emerging through at least one orifice in said second outer surface.

12. A trim element for a vehicle, comprising a functional element having a first outer surface and a second outer surface, opposite the first outer surface along a thickness direction of the functional element, the first outer surface comprising at least one display or control device relative to at least one function of the vehicle, wherein the second outer surface comprises a holder device for a nomadic electronic apparatus on said second outer surface, wherein the trim element further comprises a body, the functional element being mounted removably on said body by means of a magnetic element provided on the functional element and an additional magnetic element provided on the body, the magnetic element and the additional magnetic element cooperating with one another to keep the functional element on the body.

* * * * *